(12) United States Patent
Stelzer (10) Patent No.: US 11,919,670 B2
(45) Date of Patent: Mar. 5, 2024

(54) VERTICAL DISPLACEMENT DEVICES AND METHODS FOR MECHANICALLY INVERTING A THERMOPLASTIC CONTAINER BASE

(71) Applicant: AMCOR RIGID PACKAGING USA, LLC, Ann Arbor, MI (US)

(72) Inventor: James Stelzer, South Lyon, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 302 days.

(21) Appl. No.: 17/425,477

(22) PCT Filed: Jan. 29, 2019

(86) PCT No.: PCT/US2019/015676
§ 371 (c)(1),
(2) Date: Jul. 23, 2021

(87) PCT Pub. No.: WO2020/159482
PCT Pub. Date: Aug. 6, 2020

(65) Prior Publication Data
US 2022/0089310 A1   Mar. 24, 2022

(51) Int. Cl.
*B65B 61/24* (2006.01)
*B65D 81/20* (2006.01)
*B65D 1/02* (2006.01)

(52) U.S. Cl.
CPC .......... *B65B 61/24* (2013.01); *B65D 81/2038* (2013.01); *B65D 1/0261* (2013.01)

(58) Field of Classification Search
CPC ..... B67C 2003/226; B67C 3/045; B67C 3/22; B67C 3/24; B65B 61/24; B65B 61/28;
(Continued)

(56) References Cited

U.S. PATENT DOCUMENTS 6,422,259 B1 * 7/2002 Moreno .............. F16K 31/0665
251/366
6,942,116 B2 9/2005 Lisch et al.
(Continued)

FOREIGN PATENT DOCUMENTS

CO       5720986 A2    1/2007
CO       6311094 A2    8/2011
(Continued)

OTHER PUBLICATIONS

Office Action issued in corresponding Colombian Patent Application NC2021/0010393 dated May 26, 2023.
(Continued)

*Primary Examiner* — Jacob A Smith
(74) *Attorney, Agent, or Firm* — Harness, Dickey & Pierce, P.L.C.

(57) ABSTRACT

A displacement device for moving a truncated cone at a base of a container from an as-blown position to a displaced position. The base includes a deep base ring between a standing surface and the truncated cone. The displacement device includes a collar sized and shaped to be received within the deep base ring. A plunger includes a head at an end of a shaft extending through the collar. The head is sized and shaped to be received within the receptacle of the collar. The plunger is movable from a retracted position, at which the head is seated within the receptacle, to an extended position at which the head extends out from within the receptacle to allow the head to contact the truncated cone and move the truncated cone from the as-blown position to the displaced position.

23 Claims, 8 Drawing Sheets

(58) Field of Classification Search
CPC .............. B65D 79/008; B65D 79/0081; B65D 23/102; B29C 49/4802; B29C 49/48
USPC .......................................................... 53/433
See application file for complete search history.

(56) References Cited

U.S. PATENT DOCUMENTS

| | | | |
|---|---|---|---|
| 8,313,686 | B2 | 11/2012 | Beuerle et al. |
| 11,155,373 | B2 | 10/2021 | Melrose |
| 2010/0170199 | A1* | 7/2010 | Kelley .................... B67C 3/045 141/168 |
| 2010/0301058 | A1* | 12/2010 | Trude ................... B65D 23/102 220/660 |
| 2011/0210133 | A1 | 9/2011 | Melrose et al. |
| 2014/0166676 | A1 | 6/2014 | Melrose |
| 2016/0152457 | A1* | 6/2016 | Godet .................... B67C 3/007 53/471 |
| 2017/0096249 | A1 | 4/2017 | Lane et al. |
| 2017/0210609 | A1* | 7/2017 | Lufkin ...................... B67C 3/24 |
| 2017/0267392 | A1 | 9/2017 | Woloszyk et al. |
| 2018/0186498 | A1* | 7/2018 | Godet ...................... B67C 3/22 |

FOREIGN PATENT DOCUMENTS

| | | |
|---|---|---|
| EP | 1868790 B1 | 12/2009 |
| GB | 2263873 A | 8/1993 |
| JP | 2007216981 A | 8/2007 |
| JP | 5127243 B2 | 1/2013 |
| WO | 16059139 A1 | 4/2016 |

OTHER PUBLICATIONS

Supplementary European Search Report issued in corresponding European Patent Application No. 19913047.7 dated Jul. 15, 2022.
International Search Report and Written Opinion of the ISA issued in PCT/US2019/015676, dated Oct. 28, 2019; ISA/KR.

* cited by examiner

VERTICAL DISPLACEMENT DEVICES AND METHODS FOR MECHANICALLY INVERTING A THERMOPLASTIC CONTAINER BASE

CROSS-REFERENCE TO RELATED APPLICATIONS

This application is a U.S. National Phase Application under 35 U.S.C. 371 of International Application No. PCT/US2019/015676, filed on Jan. 29, 2019. The entire disclosure of the above application is incorporated herein by reference.

FIELD

The present disclosure relates to vertical displacement devices and methods for mechanically inverting a thermoplastic container base.

BACKGROUND

This section provides background information related to the present disclosure, which is not necessarily prior art.

Containers that are blow molded from various thermoplastics, such as polyethylene terephthalate, are used in the packaging industry to distribute food and beverages to consumers. In order to sterilize the internal product and ensure freshness, a process of hot-filling is used, which requires that the product be heated to temperatures from 180° F. to 205° F. prior to filling the container. After filling, the container is capped to integrally seal the container with a closure. After sealing, the container begins to cool resulting in an internal vacuum within the container.

Various methods have been devised to address the internal container vacuum created by the hot-fill process, such as vacuum panels, nitrogen dosing, compressible ribs and the like. One such method of controlling vacuum is by creating container base designs that move inward to reduce the internal container volume thereby lowering internal vacuum. These base designs can be passive or active. A passive base design allows the internal force of the vacuum to create the inward movement of the base panel. Active base designs require the use of an external mechanical force to reposition or displace the base inwardly. Examples of passive and active base designs can be found in the following U.S. patent documents, each of which is assigned to Amcor and is incorporated herein by reference: U.S. Pat. No. 6,942,116 titled "Container Base Structure Responsive to Vacuum Related Forces" (issued on Sep. 13, 2005); U.S. patent application Ser. No. 15/350,558 filed on Nov. 14, 2016 (Publication No. 2017-0096249 published on Apr. 6, 2017) titled "Lightweight Container Base;" and U.S. patent application Ser. No. 15/505,525 filed on Feb. 21, 2017 titled "Container Base Including Hemispherical Actuating Diaphragm."

The present disclosure advantageously includes improved vertical displacement devices and methods for mechanically inverting a thermoplastic container base. One skilled in the art will appreciate that the present disclosure includes numerous additional advantages and unexpected results as well

SUMMARY

This section provides a general summary of the disclosure, and is not a comprehensive disclosure of its full scope or all of its features.

The present disclosure includes a displacement device for moving a truncated cone at a base of a container from an as-blown position to a displaced position. The base includes a deep base ring between a standing surface and the truncated cone. The displacement device includes a collar sized and shaped to be received within the deep base ring. A plunger includes a head at an end of a shaft extending through the collar. The head is sized and shaped to be received within the receptacle of the collar. The plunger is movable from a retracted position, at which the head is seated within the receptacle, to an extended position at which the head extends out from within the receptacle to allow the head to contact the truncated cone and move the truncated cone from the as-blown position to the displaced position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
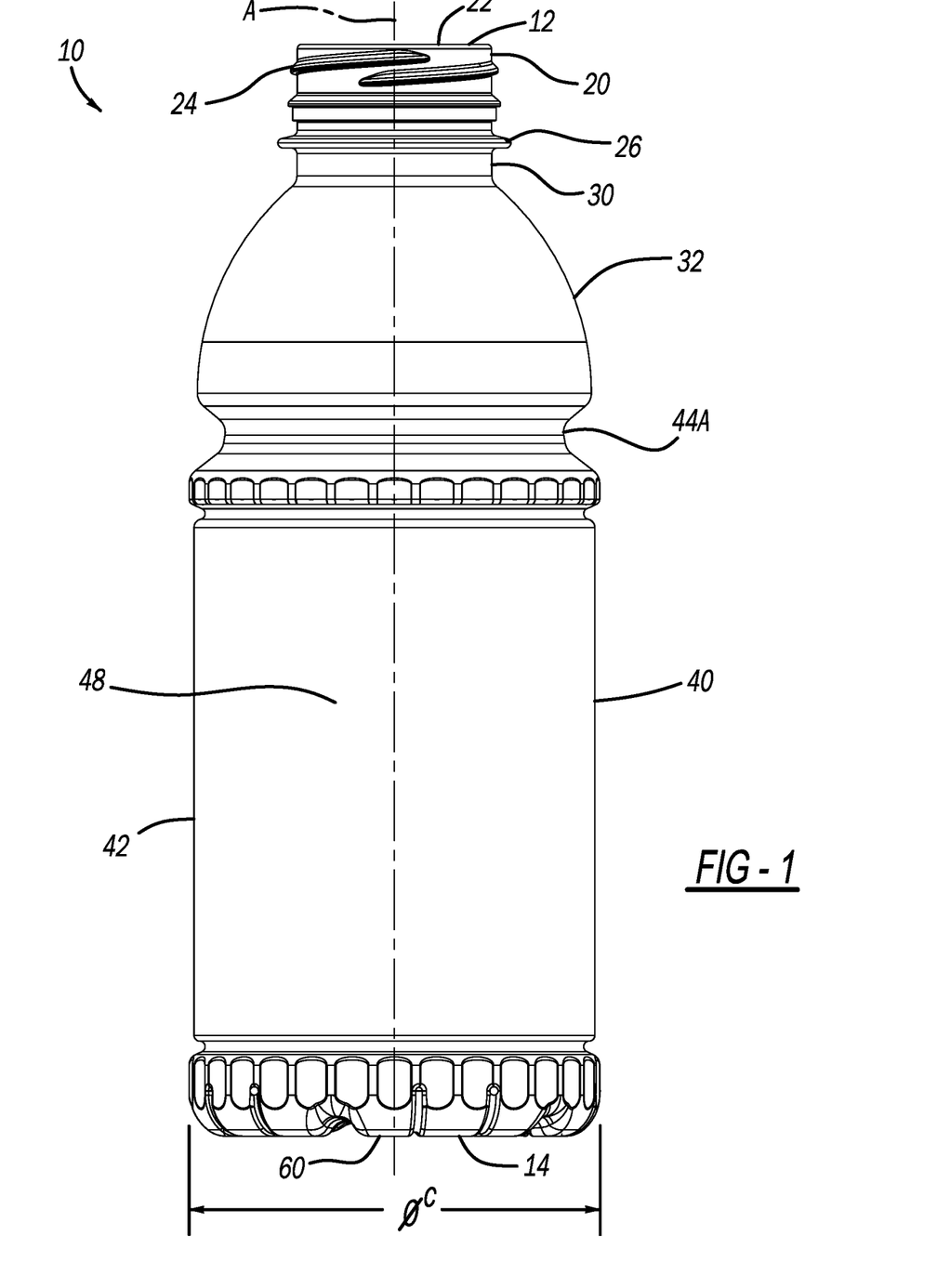
FIG. 1 is a side view of a container in accordance with the present disclosure.
Figure 2:
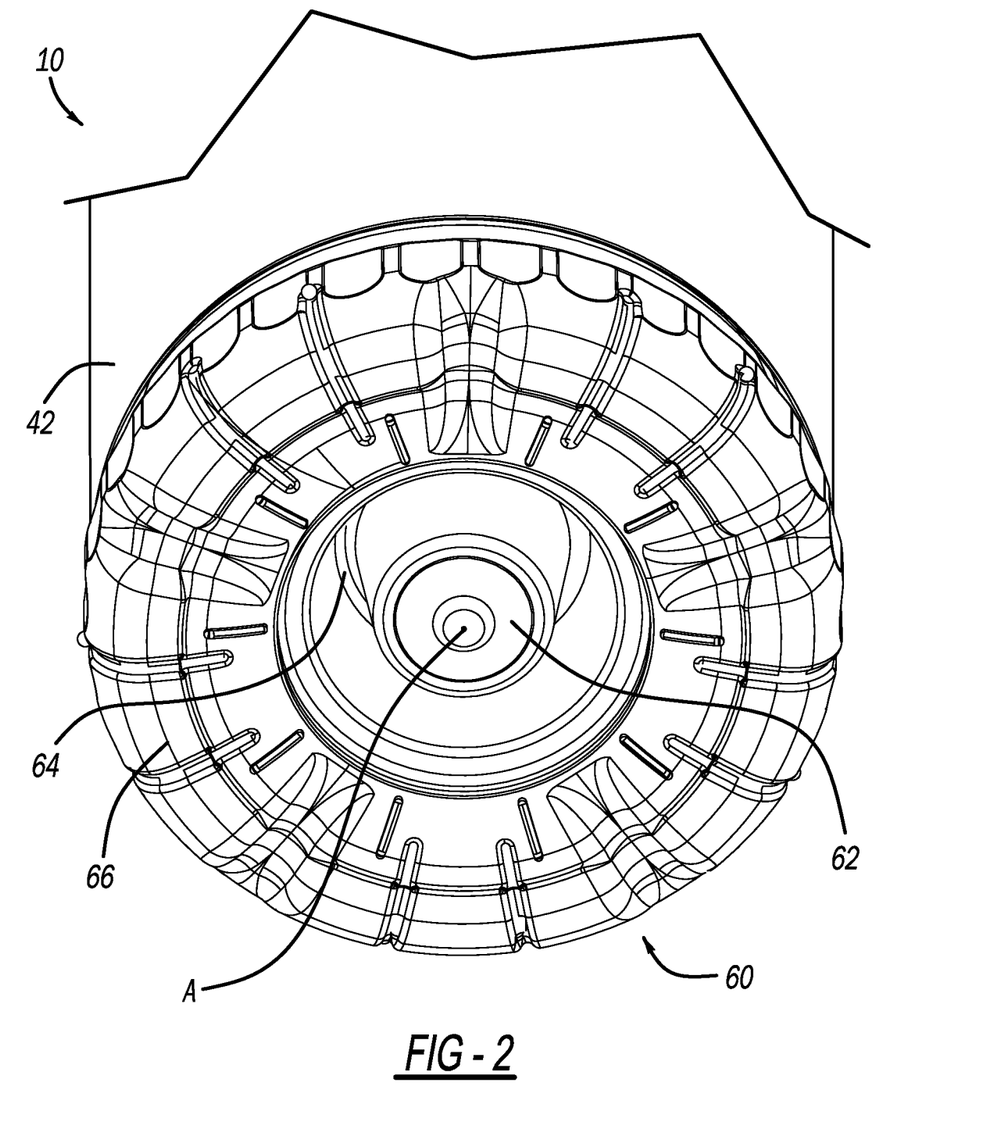
FIG. 2 is a perspective view of a base of the container of FIG. 1, the base including a truncated cone portion in an as-blown position.

FIG. 1 illustrates an exemplary polymeric container in accordance with the present disclosure at reference numeral 10. The container 10 is blow-molded from any suitable preform. The polymeric container 10 may be made of any suitable polymeric material, such as polyethylene terephthalate (PET), low-density polypropylene (LDPP), high-density polyethylene (HDPE), polypropylene, and polystyrene, for example. The material of the container 10 has an average material thickness of 0.011 inches or less. The material of the container 10 has an intrinsic viscosity (IV) of 0.68 deciliters per gram (dL/g)-0.78 dL/g for polyethylene terephthalate.

The container 10 is configured to store any suitable hot-fill material, such as any suitable beverage and/or food product. The container 10 may be of any suitable size, such as, but not limited to, 6, 8, 10, 12, 16, 20 ounces, etc., for example. The container 10 may have any suitable shape, such as, but not limited to, the shape illustrated throughout the figures. The container 10 includes an overall diameter of $\varnothing^C$.

The exemplary container 10 generally has a first end 12 and a second end 14, which is opposite to the first end 12. A longitudinal axis A extends along a length/height of the container 10 along an axial center of the container 10, which is generally cylindrical. At the first end 12 is a finish 20, which defines an opening 22 of the container 10. The finish 20 includes threads 24, or any other suitable configuration suitable for coupling a closure (e.g., cap) to the finish 20 to seal the opening 22 closed. For example, the threads 24 may be external threads as illustrated, or internal threads in some applications.

Below the finish 20 is a flange 26, which is suitable for holding the preform in a blow-molding machine as the container 10 is formed from the preform. The flange 26 is between the finish 20 and a neck 30. A shoulder 32 extends downward from the neck 30, and outward from the longitudinal axis A. The shoulder 32 extends to a body 40 of the container 10. The body 40 includes a cylindrical sidewall 42, which generally extends to a base 60 of the container 10. The sidewall 42 may include one or more ribs 44A. The body 40 defines a majority of an internal volume 48 of the container 10 in which the commodity is stored.

With continued reference to FIG. 1 and additional reference to FIGS. 2-5, the base 60 will now be described in further detail. The base 60 generally includes a truncated cone 62 at an axial center of the base 60. The longitudinal axis A extends through a center of the truncated cone 62. Surrounding the truncated cone 62, and partially defining the truncated cone 62, is a deep base ring 64. The cone 62 and the ring 64 have a diameter $\varnothing^R$. The deep base ring 64 extends into the base 60 a distance of BR (see FIG. 4) from the standing surface 66.

Figure 3:
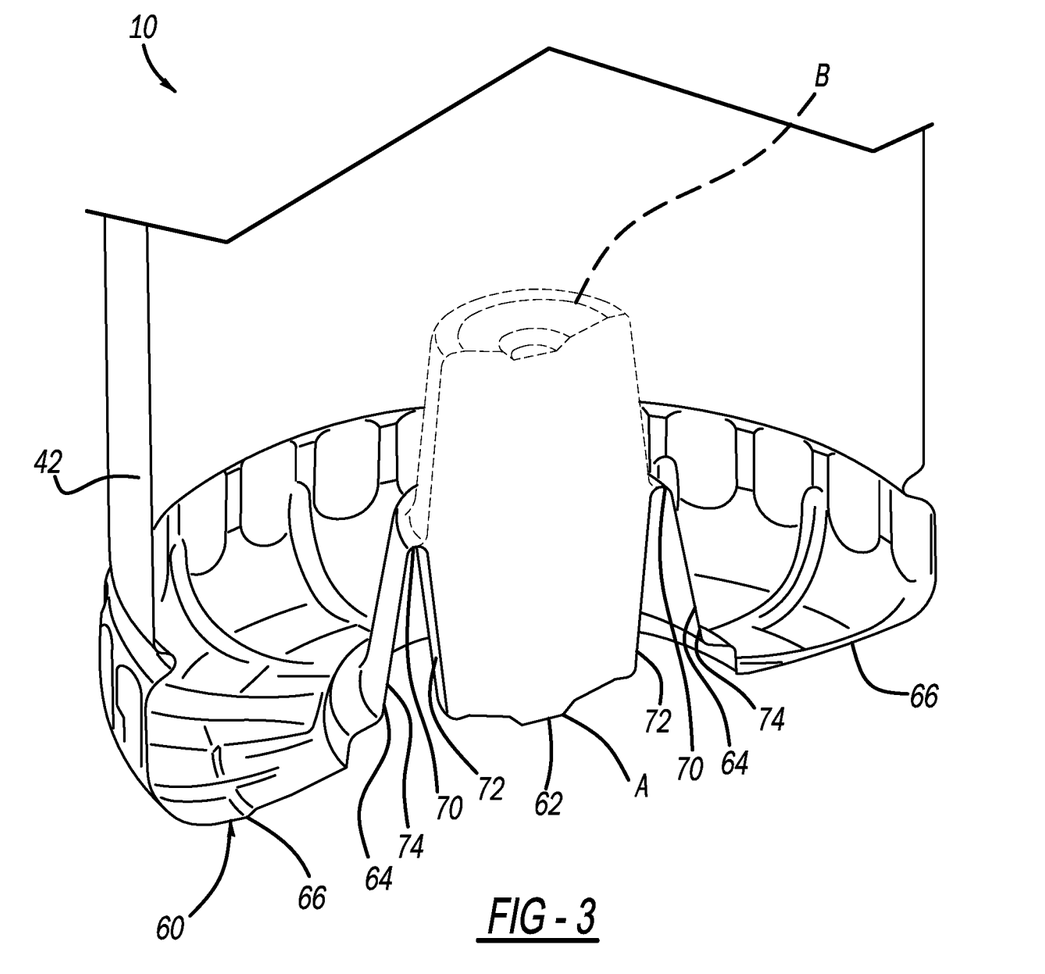
FIG. 3 is a cross-sectional view of the base of the container of FIG. 1, with solid lines illustrating the truncated cone portion in the as-blown position and phantom lines illustrating the truncated cone in a displaced position subsequent to hot-filling and mechanical displacement of the truncated cone.
Figure 4:
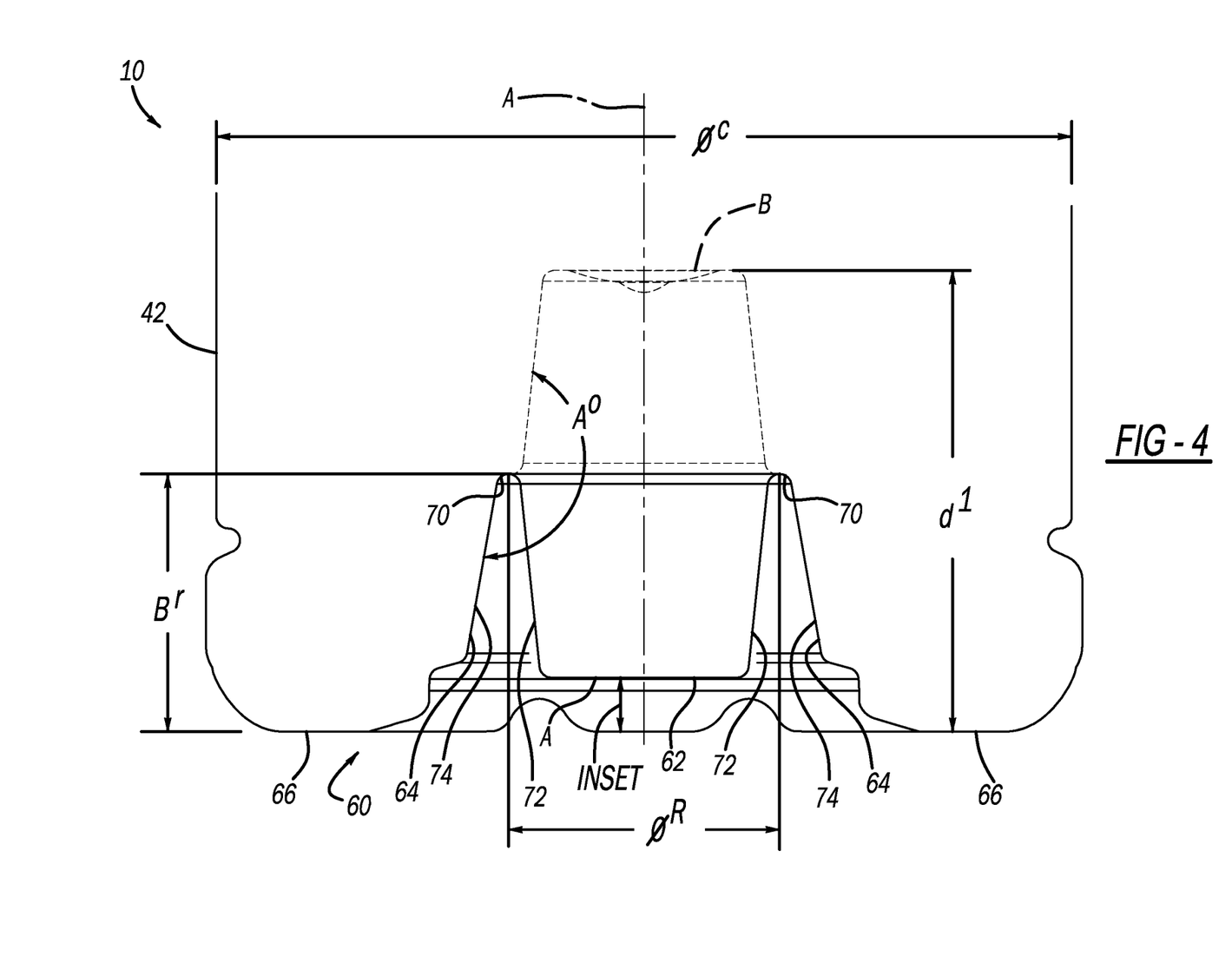
FIG. 4 is another cross-sectional view of the base of the container of FIG. 1, with solid lines illustrating the truncated cone portion in the as-blown position and phantom lines illustrating the truncated cone in the displaced position subsequent to hot-filling and mechanical displacement of the truncated cone.
Figure 5:
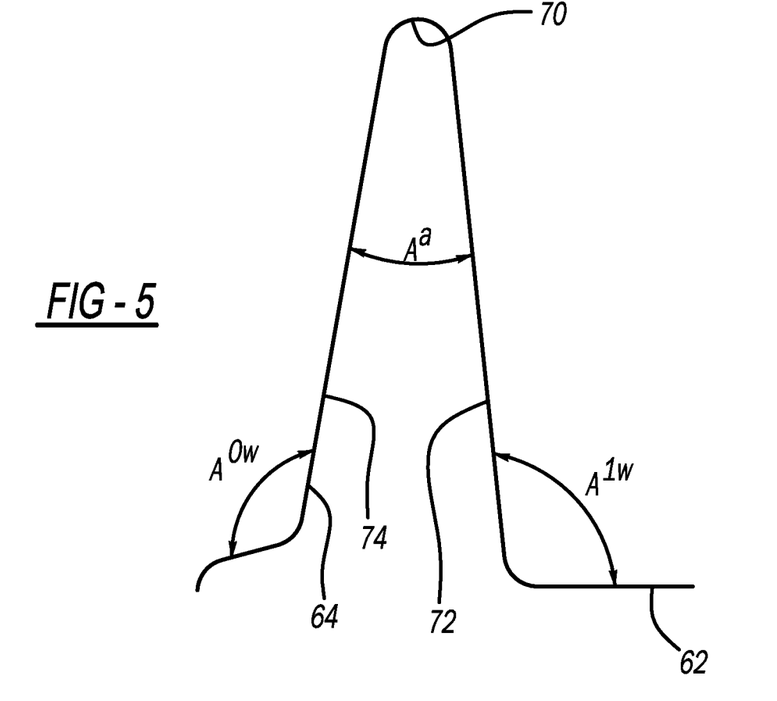
FIG. 5 is a cross-sectional view of a deep base ring of the container of FIG. 1, the deep base ring at least partially defined by the truncated cone portion in the as-blown position.

The deep base ring 64 is between the truncated cone 62 and a standing surface 66. The truncated cone 62 is inset from the standing surface 66 (see FIG. 4, for example). The standing surface 66 provides a surface configured to support the container 10 upright when seated on a flat surface. With particular reference to FIGS. 3-5, the deep base ring 64 includes a hinge 70 from which extends an inner sidewall 72 and an outer sidewall 74. The inner sidewall 72 is also part of the truncated cone 62.

The truncated cone 62 is formed in any suitable manner, such as with any suitable blow-mold with a moveable base insert ring, which is used to create the deep base ring 64 surrounding the truncated cone 62. During blow-molding of the container 10 from the preform, a base insert ring component of a blow mold is in a retracted position relative to the rest of the base tooling, which allows plastic material from the preform to flow into the cavity that is created. The base ring component is then moved into the extended position, which stretches and forms the plastic into the final shape of the deep base ring 64 (see the following U.S. patent, which is assigned to Amcor and incorporated herein by reference: U.S. Pat. No. 8,313,686 titled "Flex Ring Base," issued on Feb. 6, 2009).

FIG. 3 illustrates an as-blown position of the truncated cone 62 at reference letter A. In the as-blown position A, the inner sidewall 72 is opposite to the outer sidewall 74. With reference to FIG. 5, the inner and outer sidewalls 72 and 74 extend from the hinge 70 at an acute angle $A^a$. The acute angle $A^a$ may be any suitable acute angle, such as 16°-43°, and particularly about 25°. The inner sidewall 72 is oriented at an angle $A^{iw}$ from the truncated cone 62 at any suitable obtuse angle, such as 91°-130° as measured from a plane that is generally parallel to the standing surface 66. The outer sidewall 74 is arranged at an angle $A^{ow}$ of 91°-130° as measured from the plane that is generally parallel to the standing surface 66. The angles and depth of the deep base ring 64 can be modified to control material thickness, inversion force, reversion force, and volume displaced of the truncated cone 62.

After the container 10 is hot-filled and the opening 22 is sealed with any suitable closure, the truncated cone 62 is displaced from the as-blown position A to the retracted position B. The truncated cone 62 is displaced to the retracted position B mechanically using any suitable inversion tool, such as a displacement device 110 in accordance with the present disclosure (see FIGS. 6-8 and further described herein). In the displaced, retracted position B, the angle between the inner sidewall 72 and the outer sidewall 74 is any suitable obtuse angle $A^o$ of 143°-184°, such as 163° for example (see FIG. 4). Thus the angle between the inner sidewall 72 and the outer sidewall 74 increases from the as-blown position A to the retracted position B a factor of about 3.3-11.5 times, such as about 6.5 times. The truncated cone 62 moves a distance $d^1$ from the as-blown position A to the retracted position B. Mechanical displacement of the truncated cone 62 from the as-blown position A to the retracted position B advantageously reduces the internal volume 48, thereby decreasing vacuum or increasing pressure within the container 10.

The base 60 advantageously has a low cone diameter $\varnothing^r$ to displacement distance $d^1$ of 2:1 or less. For example, the cone diameter $\varnothing^r$ to displacement distance $d^1$ can be in the range of 0.2:1 to 2:1, such as about 1:1. The overall container diameter $\varnothing^c$ to deep base ring diameter $\varnothing^r$ is about 3:1, such as in the range of 2:1-4:1. The container diameter $\varnothing^c$ is about three times greater than the displacement distance (or activated depth) $d^1$.

The present disclosure provides numerous advantages over the art. For example, the container 10 having the dimensions and configurations set forth above enables the sidewall 42 and overall material of the container to be made thinner, particularly at the base area 60 (the material of the container 10 has an average material thickness of less than 0.010 inches). This increases the stretch induced crystallinity at the base 60, which is usually an amorphous area due to lower material stretching. The present disclosure allows for more precise control of container volume displacement to create a specific vacuum or pressure level in the container 10, and prevents over pressurization and spilling when the container 10 is opened. Furthermore, the disclosed configuration of the base 60 advantageously increases the force required to revert the truncated cone 62 from the retracted position B to the as-blown position A.

The container 10 advantageously utilizes the centrally located truncated cone 62 that is displaced a relatively long distance $d^1$ compared to the small diameter Or of the truncated cone 62. Thus the container 10 advantageously accomplishes volume reduction of the internal volume 48 using vertically oriented displacement versus transversely oriented inversion.

An advantage of the small diameter of the truncated cone 62 is that there is a large surface area between the deep base ring 64 and the heal/outer diameter of the container 10. The overall container diameter $\emptyset^c$ to the diameter $\emptyset^r$ of the deep base ring 64 is about 3:1. This area serves to support the truncated cone 62 when it is in the retracted position (activated/displaced) B so that the truncated cone 62 will not revert if a plurality of the containers are stacked or dropped. The truncated cone is mechanically displaced to the retracted position B after the container has been filled and capped. As the container 10 cools, it may be displaced at various points during cooling depending on requirements of the filling line and the amount of pressure or vacuum that is desired in the container 10 at any given point in the process. This repositioning of the base 60 may occur for example in a labeling machine at the same time an external label is applied to the label or at a dedicated station anywhere within the filling and conveying line.

Figure 6:
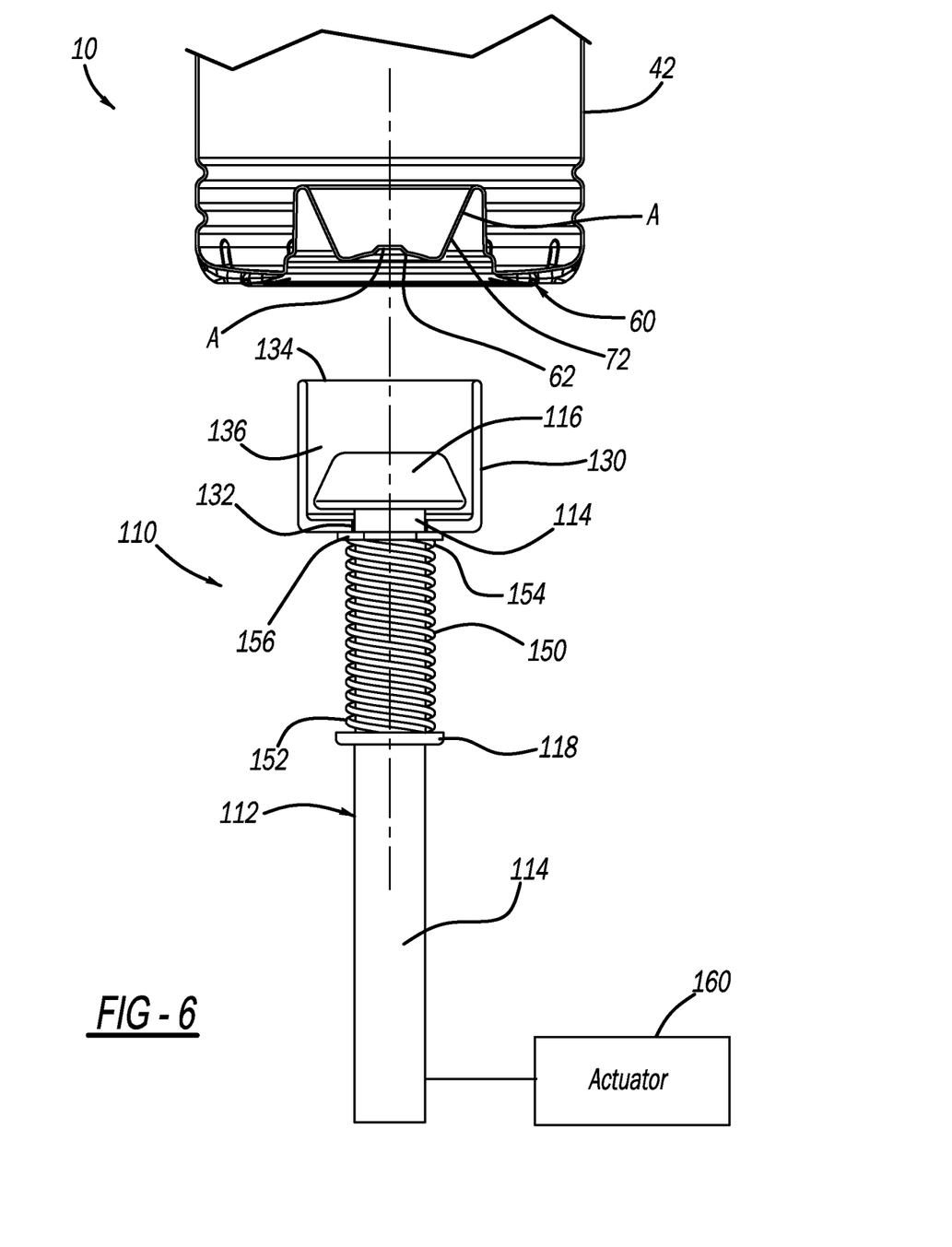
FIG. 6 illustrates a displacement device for moving the base of the container of FIG. 1 from the as-blown position to the displaced position.
Figure 7:
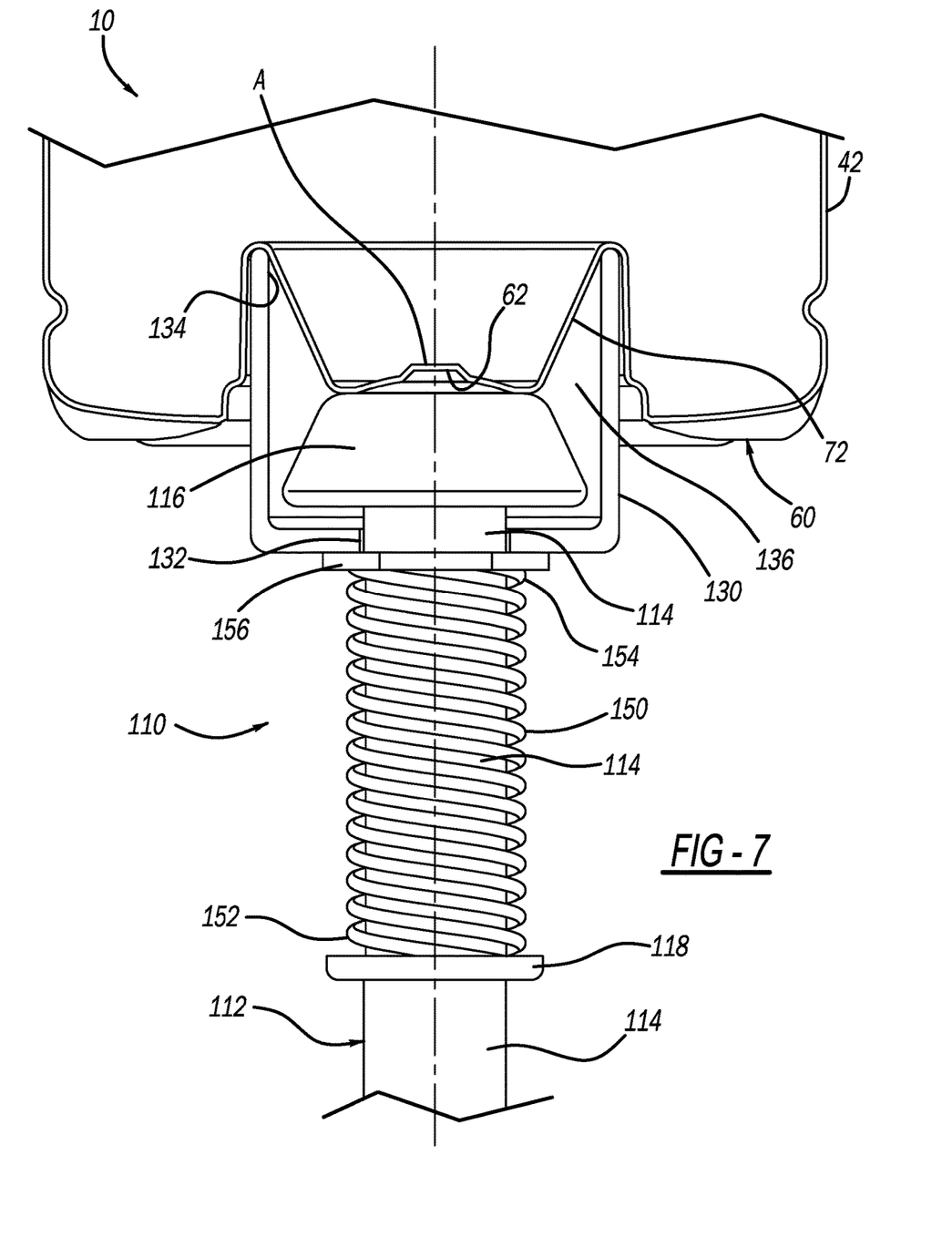
FIG. 7 illustrates the displacement device of FIG. 4 in cooperation with the base of the container, and a plunger of the displacement device in a retracted position.
Figure 8:
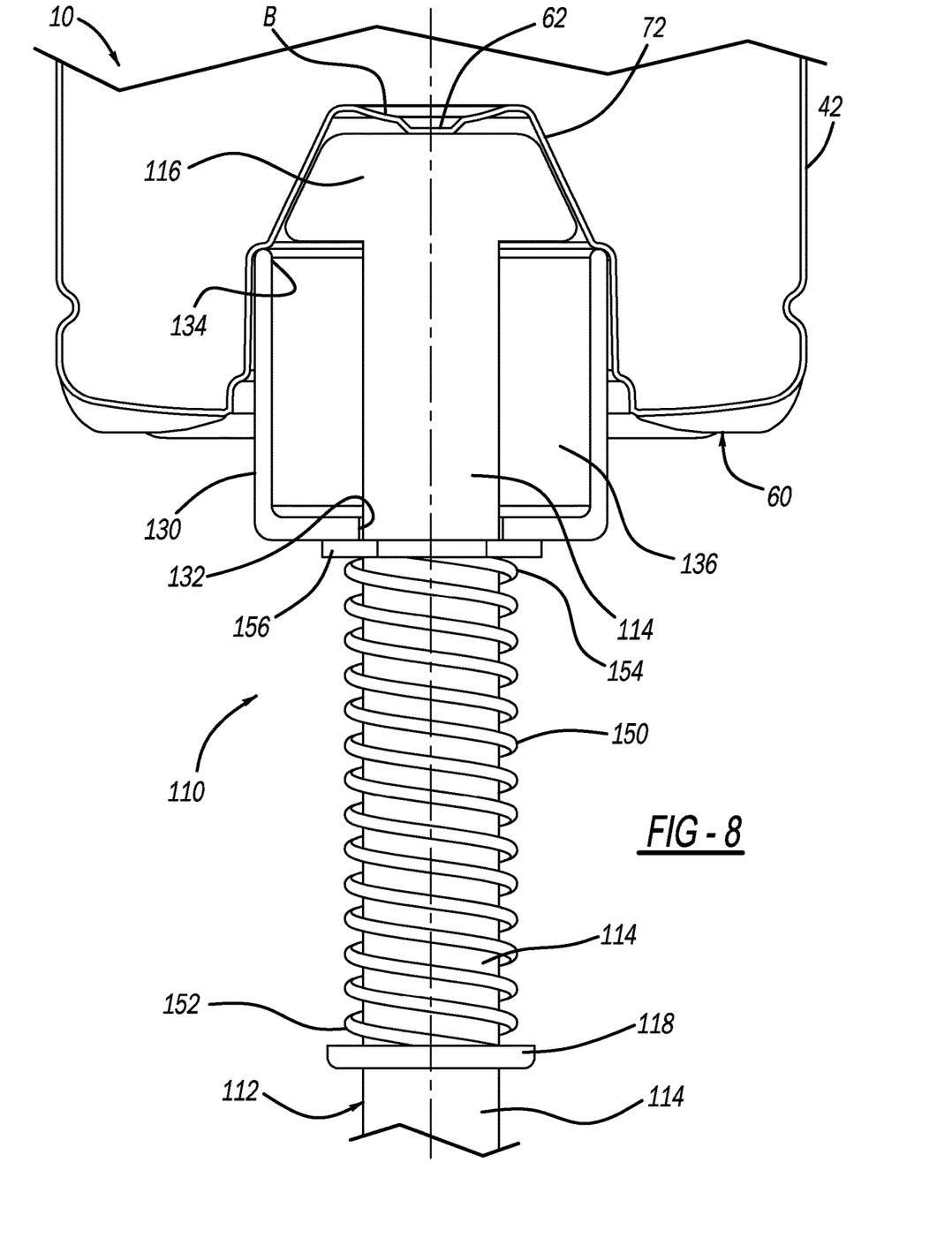
FIG. 8 illustrates the plunger of the displacement device in an extended position to move the base of the container from the as-blown position to the displaced position.

With reference to FIGS. 6-8, the displacement device 110 will now be described, along with a method of using the displacement device 110. The displacement device 110 includes a plunger 112 having a shaft 114 and a head 116 at an end of the shaft 114. Arranged along the shaft 114 is a flange 118.

The displacement device 110 further includes a support collar 130. The collar 130 defines a first aperture 132 and a second aperture 134, which is opposite to the first aperture 132. The support collar 130 defines a receptacle 136. The plunger 112 is arranged such that the shaft 114 extends through the first aperture 132. When the plunger 112 is in the retracted position of FIG. 6, the head 116 is seated within the receptacle 136.

The displacement device 110 further includes a preload spring 150. The preload spring 150 has a first end 152 and a second end 154. The preload spring 150 is seated on the shaft 114. The first end 152 is secured to the flange 118, and the second end 154 is secured at the support collar 130 with any suitable attachment device 156. The attachment device 156 may be a clip or nut, for example, or any other suitable attachment device.

The plunger 112 is moved from the retracted position of FIG. 6 to an extended position (see FIG. 8) by any suitable actuator 160. The actuator 160 may be, for example, a servo, an air cylinder, a pneumatic actuation member, etc. The preload spring 150 is biased to apply a vertical load force to the support collar 130 and to return the plunger 112 to the retracted position of FIGS. 6 and 7 after the actuator 160 moves the plunger 112 to the extended position of FIG. 8. The preload spring 150 is optional, and in some applications may be replaced by an actuator 160. The actuator 160 may be configured to apply the vertical load to the support collar 130 and return the plunger 112 to the retracted position of FIG. 6 without the need for the preload spring 150.

A method of using the displacement device 110 to mechanically move the truncated cone 62 from the as-blown position A to the displaced position B subsequent to hot-filling and capping of the container 10 to reduce an internal volume of the container 10 will now be described. Prior to displacing the truncated cone 62, the container 10 is supported at a top thereof to resist the force applied by the displacement device 110. This may be accomplished in any suitable manner, such as by holding or supporting the container support flange 26, the shoulder 32, or a closure/cap for the container 10. The container 10 is also supported at the base 60, such as at a heel of the container at the outside diameter and standing surface 66.

Once the container 10 has been properly supported, the displacement device 110 is arranged such that the support collar 130 is seated in the deep base ring 64. Specifically, the support collar 130 is arranged such that it abuts an apex of the deep base ring 64 at the hinge 70 thereby aligning and centering the device 110 with the container 10. The support collar 130 is arranged in the deep base ring 64 by the actuator 160, or any other suitable actuation device. The support collar 130 and plunger 112 can be activated by separate air cylinders, servos, or any other actuator. The spring 150 may be eliminated and replaced by a two-way servo or air cylinder that can extend and retract the plunger 112. Bearings may be included to keep the support collar 130 and the plunger 112 aligned with the container 10. The support collar 130 advantageously provides alignment to reinforce material of the deep base ring 64, the truncated cone 62, and the surrounding portions of the base 60 to advantageously prevent any possible deformation.

After the support collar 130 is arranged within the deep base ring 64, the actuator 160 moves the plunger 112 from the retracted position of FIGS. 6 and 7, to the extended position of FIG. 8. As the plunger 112 moves to the extended position of FIG. 8, the flange 118 applies force to the preload spring 150, which applies force to the collar 130. The force of the collar 130 acting against the deep base ring 64 causes the container 10 to compress vertically thereby reducing the height of the container 10 and causing a change in pressure within the container 10. The change in pressure can be in the form of a decrease in vacuum or an increase in pressure within the container 10. The change in pressure within the container 10 serves to increase the strength and rigidity of the container 10 prior to displacement of the truncated cone 62. Once the preload force of preload spring 150 has been achieved, the head 116 of plunger 112 contacts and pushes the truncated cone 62 from the as-blown position A to the displaced position B to reduce the internal volume of the container 10. After the truncated cone 62 has been moved to the displaced position B, the preload spring 150 returns the plunger 112 to the retracted position of FIGS. 6 and 7, and the actuator 160 or any other suitable actuator moves the entire displacement device 110 away from the container 10. The displacement device 110 thus advantageously provides for a mechanical displacement device that mechanically moves the truncated cone 62 from the as-blown position A to the displaced position B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A displacement device for mechanically moving a truncated cone at a center of a base of a thermoplastic container from an as-blown position to a displaced position subsequent to hot-filling and capping the container to reduce an internal volume of the container, in the displaced position the truncated cone is closer to an opening of the container than in the as-blown position, the base including a deep base ring between a standing surface and the truncated cone, the displacement device comprising:
   a collar sized and shaped to be received within the deep base ring of the container subsequent to filling and capping the container, the collar defining a receptacle; and
   a plunger including a head at an end of a shaft extending through a base of the collar, the head is sized and shaped to be received within the receptacle of the collar;
   wherein the plunger is movable from a retracted position at which the head is seated within the receptacle, to an extended position at which the head extends out from within the receptacle to allow the head to contact the truncated cone and move the truncated cone from the as-blown position to the displaced position.

2. The displacement device of claim 1, wherein the collar is sized and shaped to abut an apex of the deep base ring.

3. The displacement device of claim 1, further comprising an actuator configured to move the plunger from the retracted position to the extended position.

4. The displacement device of claim 1, further comprising a preload spring configured to apply a compressive force to the container.

5. The displacement device of claim 1, further comprising a preload spring configured to bias the plunger in the retracted position.

6. The displacement device of claim 4, wherein the preload spring is seated on the plunger, a first end of the spring is attached to a flange of the shaft and a second end of the spring is attached to the collar.

7. A displacement device for mechanically moving a truncated cone at a center of a base of a thermoplastic container from an as-blown position to a displaced position subsequent to hot-filling and capping the container to reduce an internal volume of the container, in the displaced position the truncated cone is closer to an opening of the container than in the as-blown position, the base including a deep base ring between a standing surface and the truncated cone, the displacement device comprising:
   a support collar defining a receptacle, a first aperture at a base of the support collar, and a second aperture, the support collar is sized and shaped to be received within the deep base ring of the container subsequent to filling and caping the container; and
   a plunger including a head at an end of a shaft extending through the first aperture at the base of the first aperture, the head is sized and shaped to be received within the receptacle of the support collar;
   wherein the plunger is movable from a retracted position at which the head is seated within the receptacle, to an extended position at which the head extends out from within the receptacle to allow the head to contact the truncated cone and move the truncated cone from the as-blown position to the displaced position.

8. The displacement device of claim 7, wherein the support collar is sized and shaped to abut an apex of the deep base ring.

9. The displacement device of claim 7, further comprising an actuator configured to move the plunger from the retracted position to the extended position.

10. The displacement device of claim 9, wherein the actuator is an air cylinder or a servo.

11. The displacement device of claim 7, further comprising a preload spring configured to apply a compressive force to the container.

12. The displacement device of claim 7, further comprising a preload spring configured to bias the plunger in the retracted position.

13. The displacement device of claim 12, wherein the preload spring is seated on the plunger.

14. The displacement device of claim 13, the plunger further including a flange along the shaft against which the spring is seated.

15. The displacement device of claim 14, wherein an end of the spring opposite to the flange is retained at the support collar.

16. The displacement device of claim 15, wherein the end of the spring opposite to the flange is retained with at least one of a clip or nut.

17. A method for mechanically moving a truncated cone at a center of a base of a thermoplastic container from an as-blown position to a displaced position subsequent to hot-filling and capping the container to reduce an internal volume of the container, in the displaced position the truncated cone is closer to an opening of the container than in the as-blown position, the base including a deep base ring between a standing surface and the truncated cone, the method comprising:

moving a support collar of a displacement device into cooperation with the deep base ring after the thermoplastic container has been blow molded, filled, and capped;

moving a plunger of the displacement device from a retracted position at which a head of the plunger is seated within the receptacle to an extended position at which the head extends out from within the receptacle to allow the head to contact the truncated cone and move the truncated cone from the as-blown position to the displaced position to reduce an internal volume of the container, the head is at an end of a shaft extending through a base of the support collar; and     removing the support collar from cooperation with the deep base ring.

18. The method of claim 17, further comprising moving the support collar and the plunger with an actuator.

19. The displacement device of claim 17, further comprising a preload spring configured to apply a compressive force to the container.

20. The method of claim 17, wherein the plunger is returned to the retracted position from the extended position by a preload spring.

21. The method of claim 17, wherein in the retracted position a head of the plunger is seated in the support collar, and in the extended position the head extends out from within the support collar.

22. The method of claim 21, wherein a shaft of the plunger extends through a first aperture defined by the support collar, and the head extends out from within the support collar through a second aperture of the support collar that is opposite to the first aperture.

23. The method of claim 21, wherein moving the support collar of the displacement device into cooperation with the truncated cone includes moving the support collar into cooperation with an apex of the deep base ring.

\* \* \* \* \*